July 30, 1940.   E. WEBER   2,209,641
VEHICLE DRIVING AND STEERING SYSTEM
Filed June 7, 1938   3 Sheets-Sheet 1

Inventor
Ernst Weber,
By Ralph B. Stewart
Attorney

July 30, 1940.  E. WEBER  2,209,641

VEHICLE DRIVING AND STEERING SYSTEM

Filed June 7, 1938  3 Sheets-Sheet 3

Inventor
Ernst Weber,
By Ralph B. Stewart
Attorney

Patented July 30, 1940

2,209,641

UNITED STATES PATENT OFFICE 2,209,641

VEHICLE DRIVING AND STEERING SYSTEM

Ernst Weber, Mount Vernon, N. Y., assignor to The Power Transmission Company, Incorporated, a corporation of Delaware Application June 7, 1938, Serial No. 212,339

13 Claims. (Cl. 180—17)

This invention relates to systems for driving and steering vehicles of the type in which independently rotatable traction elements are provided on opposite sides of the vehicle.

An object of the invention is to devise a system for accelerating and driving vehicles of large weight, such as tractors, military tanks and the like. My invention involves the automatic acceleration of the vehicle without the use of manually shiftable change-speed gearing and without interruption of the driving torque.

A further object of my invention is to devise a driving system for vehicles having independently rotatable traction elements on opposite sides of the vehicle, and to provide means for facilitating the steering of the vehicle by controlling the amount of power supplied to the traction elements on opposite sides of the vehicle.

Still another object of my invention is to devise a driving system for vehicles having independently rotatable traction elements on opposite sides thereof and to provide automatic means for maintaining the vehicle on a substantially straight course, regardless of the condition of the terrain over which the vehicle is moving. According to my invention the amount of power supplied to each traction element is automatically varied in accordance with the speed variations of the traction element.

My invention is illustrated in the accompanying drawings, in which:

Figure 1a is a fragmentary circuit diagram illustrating a modified arrangement for steering the vehicle;

Figure 1b is a fragmentary view, partly in section, indicating the differential gear arrangement employed in Figure 1;

Figure 2a is a fragmentary view showing a modified connection for the regulator of Figure 2;

Figure 2b is a fragmentary view indicating a modified control arrangement of Figure 2;

Figure 1:
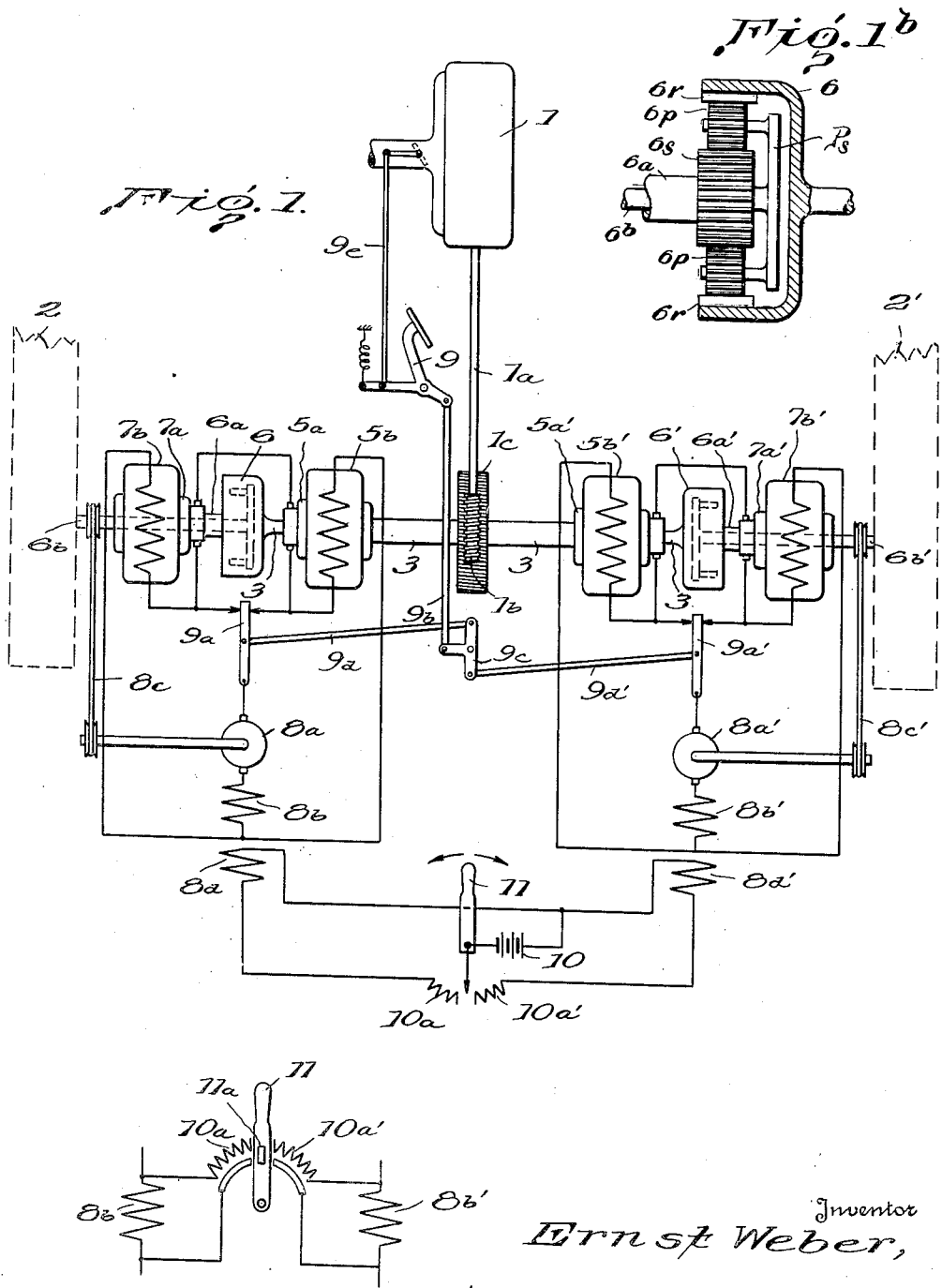
Figure 1 is a schematic diagram illustrating one form of the invention.

Referring to Figure 1, a suitable source of power, such as an internal combustion engine, for driving the vehicle is indicated at 1, and two independently rotatable traction elements located on opposite sides of the vehicle are shown in dotted lines at 2 and 2'. The engine shaft 1a drives the worm 1b having driving engagement with a worm gear 1c which drives transverse shaft 3. If a 1:1 drive ratio is desired between shafts 1a and 3, a set of bevel gears may be used to connect these shafts. Since the transmission arrangements extending from the worm gear 1c to each of the traction elements 2 and 2' are identical, a detailed description will be given of only one arrangement, the other arrangement being illustrated in the drawings and identified by corresponding reference numerals distinguished by the "prime" mark.

Shaft 3 drives the armature 5a of a dynamo (hereinafter referred to as a "booster" dynamo). Shaft 3 also drives the ring gear 6r (see Figure 1b) of a differential gear set 6 arranged at one end of the shaft. The sun gear 6s of gear set 6 drives armature 7a of a second dynamo (hereinafter referred to as a "reducer" dynamo) through a hollow shaft 6a, and the output or load shaft 6b for the traction element 2 is driven from the planet spider Ps which carries planet gears 6p. Suitable reduction gears may be interposed between the load shaft 6b and the traction element 2 if desired. The booster dynamo is provided with a field element 5b and the reducer dynamo is provided with a field element 7b.

The two transmission units connecting the power shaft 1a through the worm gear 1c to the traction elements 2 and 2' each involves a differential gear set, and the two floating elements (shafts 6a and 6a') of these gear sets are driven from the engine by means of fluid current circuits (electric circuits) in which the direction and amount of power flow may be controlled to vary the speed and torque relations between the drive shaft and the traction element.

The two power dynamos in each of the transmission units are connected in circuit with each other so that the armatures and the field elements of both dynamos are all connected in serial circuit relation as shown in Figure 1. The reducer dynamo 7a—7b is connected to act as a series generator when the load shaft 6b is stationary and the booster dynamo 5a—5b is connected to act as a series motor driven by the reducer dynamo and adds its torque to the engine torque. In order to control the direction and amount of power flow in the electric circuit, I provide a regulator generator having an armature 8a and a series field 8b, the armature being driven from the load shaft 6b by any suitable means such as the belt drive 8c. Suitable switching means diagrammatically represented by the switch lever 9a is provided for connecting the regulator generator normally in shunt to both field coils of the reducer and booster dynamos, and by operation of the switching means to one position or the other, the regulator is disconnected from one of the field windings but remains connected across the other. The switching means 9a may be controlled manually, but I prefer to control the switch by movement of the accelerator operating element represented by the pedal 9 through suitable mechanism represented by link 9b, bell crank 9c, and link 9d, the throttle of the engine 1 being controlled by the pedal 9 through link 9e. Suitable switching arrangements for connecting the regulator generator in shunt to the field windings of the power dynamos and for controlling these connections by movement of the accelerator pedal are shown in U. S. Patent 2,000,786 and in my copending application Serial No. 189,014, filed February 5, 1938. The arrangement may be such that with the accelerator pedal released, the regulator is connected in shunt to the reducer dynamo field only, and when the accelerator is depressed the regulator is disconnected from the reducer field and connected in shunt to the booster field, such an arrangement being shown in U. S. Patent 2,000,786. I prefer, however, to employ the arrangement disclosed in my copending application Serial No. 189,014 in which the regulator is normally connected in shunt to both field windings with the accelerator in released position, and depression of the accelerator disconnects the regulator from the reducer field. With this arrangement, the two armatures and the two fields of the power dynamos are short-circuited upon each other when the engine is idling.

Operation of the arrangement shown in Figure 1 is as follows:

The operation for straight forward drive will be described for only one transmission unit, since the operation is the same for both units. With the load shaft stationary, and the engine idling, the two armatures 5a—7a and the two field elements 5b—7b of the power dynamos are short-circuited upon each other and no power is developed in the electric system. Upon depression of the accelerator, the regulator is disconnected from the reducer winding, and the reducer dynamo operates as a generator to supply current to the booster dynamo to drive this dynamo as a motor, a part of the power current passing through the regulator 8a—8b in shunt to the booster field 5b. As the vehicle accelerates, a voltage is generated in regulator 8a—8b in a direction to increase the shunting effect around the field 5b. Continued increase in the vehicle speed increases the voltage generated by the regulator and thereby shunts more current around the booster field, and, when the voltage generated by the regulator equals the internal voltage drop in the shunt circuit, the current in the booster field becomes zero. Further increase in vehicle speed causes current to flow through the booster field from regulator 8a—8b in the opposite direction from that of the current supplied from the reducer dynamo and the booster dynamo then begins operation as a generator to sustain the flow of current in the transmission circuit in the same direction as established originally by the reducer dynamo. Simultaneously with the acceleration of the vehicle, the reducer dynamo armature slows down in speed of rotation and comes to a standstill subsequent to the time when the booster begins to act as a generator, and then the reducer dynamo reverses its direction of rotation and adds its speed to the engine speed for driving the load shaft, the reducer being driven as a motor from the booster dynamo. It will be understood that by using any of the control arrangements shown in U. S. Patent 2,000,786 and in my application Serial No. 189,014, the general operation will be the same as in the prior arrangements, and the same flexibility of control will be available.

Upon releasing the accelerator pedal in Figure 1, the two regulators are connected in shunt to the field windings of the two reducer dynamos and these two dynamos then operate as generators to drive the booster dynamos as motors and supply a braking force to the vehicle. Under this condition of operation, exciting current is supplied to both field windings 5b and 7b by the regulator 8a—8b.

The vehicle may be driven in reverse direction by providing a suitable switching arrangement for reversing the field connections with respect to the armature connections, as will be apparent from U. S. Patent 2,000,786 and in my application Serial No. 189,014.

For the purpose of steering the vehicle, I provide means for at will changing the standard of operation of the regulators associated with two traction elements, that is, I provide means for changing the degree of response of the regulators to changes in speed of the traction elements. One suitable arrangement for this purpose is to provide additional field coils 8d and 8d' on the two regulators which are supplied with a variable current from a battery 10 through the variable resistance elements 10a and 10a' controlled by steering lever 11. The two variable resistances 10a and 10a' for controlling the two regulators are conveniently arranged in a position to be controlled by movement of the steering lever 11 in opposite directions as shown in Figure 1.

When it is desired to steer the vehicle to the left, the lever 11 is moved to the left and the coil 8d' for the regulator associated with the traction element 2' is energized to increase the voltage generated by the regulator, and thereby increase the voltage generated by the booster dynamo 5a'—5b' which is assumed to be operating as a generator. The increased load imposed upon the booster dynamo 5a'—5b' causes reducer dynamo 7a'—7b' to speed up which results in a speeding up of the traction element 2'. For steering to the right, the lever 11 is moved to the right to increase the excitation of the regulator associated with booster dynamo 5a—5b, and thus causing speeding up of the traction element 2. Normally the system is adjusted so the two traction elements will operate at the same speed so that with the lever 11 in central position, the vehicle will run in a straight line.

Instead of supplying additional excitation to the regulator generators, steering may be accomplished by controlling the excitation in other ways such as by shunting the field winding on the regulator, and an arrangement for this purpose is shown in Figure 1a. In this arrangement, the lever 11 carries an insulated contact 11a which, when moved to the right, will variably shunt the field winding 8b' of the regulator associated with the traction element 2', and when moved to the left will variably shunt the field winding 8b of the regulator associated with the traction element 2. In using the arrangement of Figure 1a, as the lever is moved to the right, the excitation of the regulator 8a'—8b' is weakened and the power delivered by the corresponding booster 5a'—5b' is accordingly reduced, thus permitting a slowing down of the traction element 2'. The same operation takes place with respect to traction element 2 when the lever is moved to the left.

Where greater driving torque is required, reverted differential gear sets may be employed at 6 and 6' instead of the simple gear sets described. One example of reverted gear set is illustrated in Figure 2 of the drawings, but the invention is not limited to the particular gear sets herein shown and described.

Figure 2:
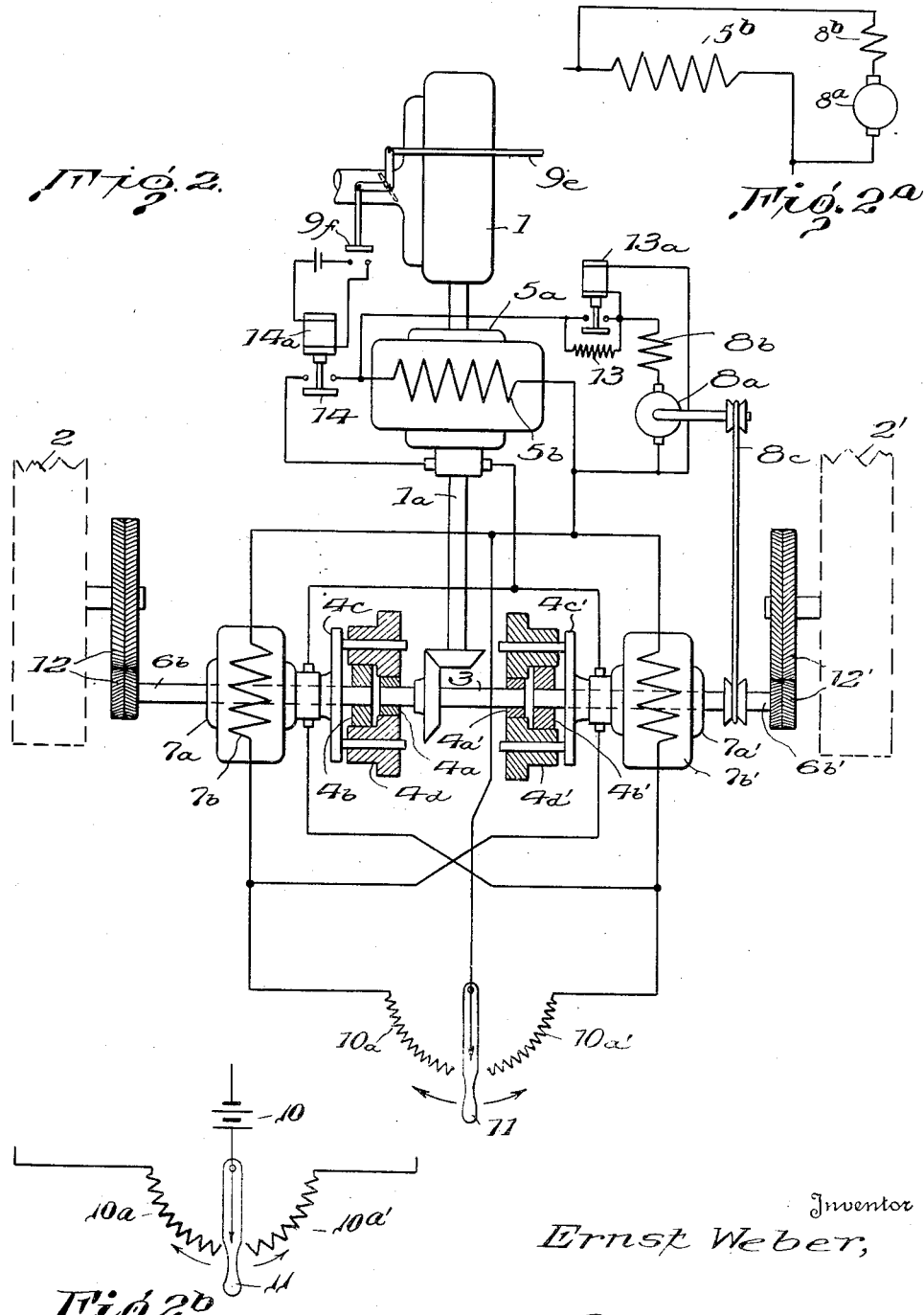
Figure 2 is a schematic diagram illustrating a second form of driving and steering system according to my invention.

In Figure 2, I have shown a modified arrangement of my invention in which only three dynamos are employed, one dynamo being arranged in a common portion of the power transmission paths extending from the engine to the traction elements 2 and 2'. This arrangement offers the advantage of conservation in both space and weight.

In Figure 2 the armature 5a of a single booster dynamo is driven by the engine shaft 1a, and the transverse shaft 3 is also driven from the engine shaft 1a by a set of beveled gears as shown. Transverse shaft 3 is connected to load shaft 6b and the armature 7a of one of the reducer dynamos through a reverted differential gear set comprising a small sun gear 4a mounted on the end shaft 3 and a larger sun gear 4b secured to the end of load shaft 6b, the armature 7a being driven by the planet spider 4c on which is journaled a series of compound planet gears 4d engaging with sun gears 4a and 4b respectively. The load shaft 6b', associated with traction element 2', and the armature 7a' of the second reducer dynamo, are driven from the opposite end of shaft 3 by means of a similar reverted gear set 4a'—4b'—4c'—4d'. On heavy vehicles, I prefer to use reverted differential gear sets of the type illustrated in order to obtain large torque multiplication, but any suitable differential gear set may be employed. Load shafts 6b and 6b' may be directly connected to traction elements 2 and 2', or suitable reduction gears indicated at 12 and 12' may be interposed between the load shafts and the corresponding traction elements.

Only one regulator is required in the arrangement shown in Figure 2, and the armature 8a of this regulator may be driven from either drive shaft, or suitable clutch arrangements may be provided so that the regulator armature will be driven from whichever shaft is operating at the higher speed. The regulator 8a—8b may be permanently connected in shunt to the field 5b of the booster as shown in Figure 2a, but I prefer to connect the regulator in shunt to the booster field 5b through a resistance 13 which is adapted to be short-circuited at a predetermined vehicle speed by relay 13a energized from the regulator generator 8a—8b. This particular connection of the regulator is disclosed in my co-pending application 139,014, filed February 5, 1938.

The reducer dynamos are connected to the booster dynamo by parallel circuits, but it should be noted that the armature of one reducer is connected in series with the field winding of the other reducer in one branch circuit, and the field winding of the first reducer is connected in series with the armature of the second reducer in the second parallel circuit. The advantage of this particular connection is that it tends to maintain the vehicle on a straight course independently of differences in the nature of the terrain over which the two traction elements are moving, as will be explained more fully hereinafter.

For the purpose of steering the arrangement shown in Figure 2, I provide a steering lever 11 movable in one direction to shunt reducer field 7b by variable resistance 10a and movable in the opposite direction to shunt reducer field 7b' by variable resistance 10a'.

A switch 14 is inserted in the booster circuit for the purpose of disabling the transmission system when the engine is idling, and this switch may conveniently be controlled by means of a relay 14a which in turn is controlled by a switch 9f operated from the lever 9e which also controls the engine throttle. It will be understood that the arrangement is such that the switch 9f is open when the throttle is in idling position, but remains closed for all positions of the throttle operating lever except idling.

Operation of the arrangement shown in Figure 2 is as follows: With the engine idling and the vehicle at rest, the system is in the condition shown in Figure 2. Depression of the accelerator control closes the switch 9f and effects the closing of switch 14. As the engine speeds up, both reducer dynamos will operate as generators supplying current to the booster dynamo which operates as a motor adding its torque to the engine torque. The reaction on the two reducer armatures applies to a torque to load shafts 6b and 6b' to start the vehicle. A certain amount of the current supplied from the reducer dynamos is shunted around the field 5b of the booster through the regulator 8a—8b and through resistance 13. As the vehicle accelerates, a voltage is generated in regulator 8a—8b in a direction to increase the shunting effect around the field 5b. When the vehicle reaches a predetermined speed, for example, a speed of eight miles per hour, the voltage supplied by the regulator is sufficient to operate relay 13a, thereby connecting the regulator directly in shunt to the booster field 5b. Continued increase in the vehicle speed increases the voltage generated by the regulator and thereby shunts more current around the booster field, and, when the voltage generated by the regulator equals the internal voltage drop in the shunt circuit, the current in the booster field becomes zero. Further increase in vehicle speed causes current to flow through the booster field from regulator 8a—8b in the opposite direction from that of the current supplied from the reducer dynamos and the booster dynamo then begins operation as a generator to sustain the flow of current in the transmission circuits in the same direction as established originally by the reducer dynamos. Simultaneously with the acceleration of the vehicle, the reducer dynamo armatures slow down in speed of rotation and come to a standstill subsequent to the time when the booster begins to act as a generator, and then each reducer dynamo reverses its direction of rotation and adds its speed to the engine speed for driving the two load shafts, the two reducers being driven as motors from the booster dynamo.

In steering the arrangement of Figure 2, if the control lever 11 is moved to the left, for example, reducer field winding 7b will be shunted through variable resistance 10a. This causes a weakening of the field of reducer dynamo 7a—7b and also decreases the resistance of the circuit in which this field winding is located. The reduction in field strength of reducer 7a—7b causes a decrease in the counter E. M. F. of armature 7a which results in an increase in current flowing through the field winding 7b' of the opposite reducer dynamo. The decrease in resistance of the circuit including field 7b causes an increase of current to flow in the armature 7a' of the opposite reducer. The increased currents flowing in armature 7a' and in field 7b' results in an increased torque applied to the load shaft 6b' and this causes the traction element 2' to speed up, and traction element 2 slows down due to the loss of torque in the reducer 7a—7b. In a like manner, movement of the lever 11 to the right causes a reduction in torque of the reducer 7a'—7b' and an increase in torque of reducer 7a—7b which causes the track 2' to decrease in speed and the track 2 to increase in speed.

Instead of weakening the field of one of the reducer dynamos, the vehicle may be steered by increasing the field strength of one reducer. For this purpose, I may employ a battery 10 which can be connected in series with steering lever 11 as shown in Figure 2b. When the battery 10 is connected in the proper direction to increase the current flowing through the reducer field to which it is connected through lever 11, this reducer operates with increased torque, and causes its corresponding track element to increase in speed. It will be noted that under this condition the vehicle is steered in the opposite direction from that where the field strength is weakened.

Figure 3:
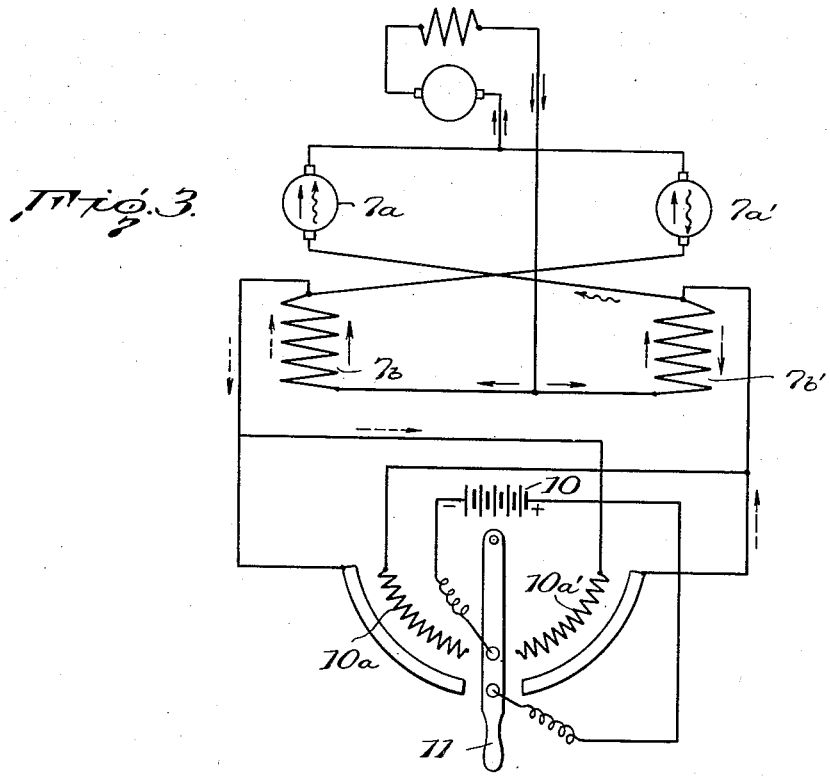
Figure 3 is a circuit diagram illustrating a modified arrangement of steering control for the system shown in Figure 2.

In Figure 3 I have shown a modified steering arrangement for the system shown in Figure 2. In this arrangement, the lever 11 is arranged to connect the battery 10 in series with one of the variable resistances 10a or 10a' and in series with the two reducer fields 7b and 7b'. When lever 11 is moved to the left, the battery is connected to the reducer fields in one direction, and when the lever is moved to the right, the connection of the battery is reversed. With this arrangement, the battery current flows in series through both reducer fields and strengthens one field while reducing the other field. At the same time, a parallel path for battery current is provided over the two armatures, the battery current in one armature being in the same direction as the generated current and opposed to the generated current in the other armature. The direction of flow of the generated current is indicated by straight solid arrows. The battery current flowing through the reducer fields when the lever 11 is moved to the right is indicated by the arrows shown in dotted lines, and the battery current flowing through the reducer armature circuit is shown by the arrows in wavy lines. It will thus be seen that the field 7b is strengthened while the field 7b' is weakened. Also, the current in armature 7a is increased while the current in 7a' is decreased. Under this condition, track 2 will speed up and the vehicle will be steered to the right.

By proper selection of the circuit constants of the arrangement shown in Figure 3, it is possible by movement of the lever 11 in one direction to first weaken the field of one of the reducers until it reaches zero and further movement of the lever in the same direction reverses the current in the reducer field and thereby causes this reducer to operate as a motor in such direction that its corresponding track is driven in the opposite direction from that of the opposite track. This condition of operation will be especially useful for turning the vehicle on a short radius or "on the spot."

Figure 4:
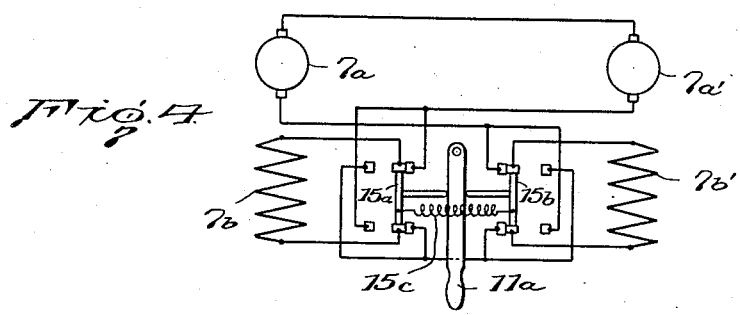
Figures 4 and 5 are circuit diagrams of modifications of Figure 2 for turning the vehicle without the aid of the booster dynamo.

In Figure 4 I have shown a control arrangement for use in turning the vehicle "on the spot" without the aid of a battery and without the aid of the booster dynamo. This arrangement may be embodied in the arrangement shown in Figure 2 and is brought into operation only for the purpose of turning the vehicle on a short radius. Two reversing switches 15a and 15b are provided to reverse the connections to reducer field windings 7b and 7b' respectively. These switches are normally biased by suitable means represented by spring 15c to a position to secure operation of the reducer dynamos in accordance with the arrangement of Figure 2. An auxiliary control lever 11a is provided for operation of the switch 15a by movement of the lever in one direction and operation of switch 15b by movement of the lever in the opposite direction. By movement of the lever 11a to the left, field winding 7b is reversed, and reducer 7a—7b is then connected for operation as a series generator to drive reducer 7a' and 7b' as a motor. Under this condition of operation, all of the engine power is supplied to drive reducer 7a—7b as a series generator, the armature 7a rotating in the same direction as for stationary load shaft but at reduced speed, and the resistive torque of the armature serving to move its corresponding track 2 in the forward direction. Reducer 7a'—7b' is driven electrically as a motor from reducer 7a—7b, the armature 7a' rotating in the same direction as the armature 7a but at increased speed, so that the active torque of the armature 7a' drives its track 2' in the reverse direction. Thus, turning of the vehicle is accomplished solely by operation of the two reducer dynamos, one operating as a generator driving its track forward and the other reducer operating as a motor driving its track in reverse direction. The circuit to the booster dynamo remains open in using the control arrangement shown in Figure 4 for turning the vehicle. It will be understood that the lever 11a is operated only at a time when it is desired to turn the vehicle on a short radius and at a low speed. Steering of the vehicle is accomplished by separate control means such as the arrangements shown in Figure 2 or 3.

Figure 5:
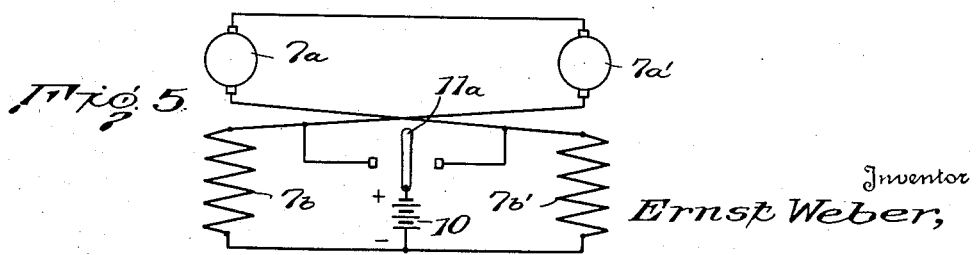

In Figure 5 I have shown another arrangement of auxiliary control which may be embodied in Figure 2 for the purpose of turning the vehicle "on the spot." In this arrangement, I obtain operation of one of the reducer dynamos as a generator by connecting battery 10 in shunt to its field winding through auxiliary control lever 11a, the battery 10 serving to maintain the field in proper direction for generator operation independently of the current flowing in the circuit connecting the two dynamos. By operating lever 11a to the left battery 10 will establish current in field winding 7b, thus permitting reducer 7a—7b to operate as a generator with its track rotating in forward direction, and reducer 7a'—7b' operates as a motor driven from reducer 7a—7b and in the same direction as armature 7a but at increased speed, thus driving its track in reverse direction. It will be understood that the control arrangement illustrated in Figure 5 is used only for the purpose of turning the vehicle "on the spot," and normal forward operation and steering of the vehicle is accomplished by separate control means such as the arrangement shown in Figure 2 or 3. The booster dynamo and the steering control arrangements have not been shown in Figures 4 and 5, in order to simplify the showing of the auxiliary controls which may be used for turning the vehicle at low speed.

In Figure 5, the load current flowing in the circuit connecting the two dynamos tends to reduce the field strength of the generating dynamo by reason of the fact that the field winding of this reducer is included in the circuit in the wrong direction for self-excitation. It will be obvious that this field winding need not be included in the circuit and provision may be made to exclude the field winding from the circuit when the battery 10 is connected to the field winding of the generating reducer, thus leaving only the armature and series field of the motoring reducer connected in circuit with the armature of the generating reducer which operates as a separately excited generator.

Since each traction element in Figure 1 is provided with its own regulator for controlling the speed and torque ratio of the drive to each traction element in accordance with variations in speed of the respective traction elements, this arrangement inherently tends to maintain the vehicle on a straight course regardless of the condition of the soil over which the vehicle moves. For example, assuming that one traction element meets with an obstruction or greater resistance than the other traction element, it will tend to slow down, and its regulator will operate at reduced speed to increase the torque applied to the traction element and thereby supply the additional torque required to overcome the increased resistance. Should one traction element meet with less resistance than the other, it will tend to speed up and the action of the associated regulator at increased speed will tend to reduce the applied torque and thereby decrease the torque supplied to the traction element. Thus, the two regulators act as governors tending to maintain the same speed on the two traction elements.

In arrangements of the type shown in Figure 2, if one track element (track 2) encounters greater resistance than the other track element, it will slow down, and, assuming that the booster is driving both reducers as motors, the reduced speed of armature 7a results in less counter E. M. F. which permits greater current to flow through armature 7a and thereby provide increased torque in reducer 7a—7b to overcome the increased resistance. The increased current flowing through armature 7a also increases to a certain extent the excitation of reducer field 7b' which permits reducer 7a'—7b' to slow down and tends to equalize the speeds of the two track elements.

The various figures of the drawings are merely schematic diagrams illustrating the main features of my invention, and it will be understood that in practice it will be found convenient to add additional control elements which have not been illustrated. For example, in practice a suitable controller would be provided for controlling the circuit connections for forward drive, neutral, and reverse drive, similar to the arrangements disclosed in my copending application Serial No. 189,015. Reverse drive is obtained by reversing the connections to either the armature or the field of each reducer dynamo.

What I claim is:

1. In combination, a vehicle having independently rotatable traction elements on opposite sides thereof, an engine for driving said vehicle, a driving connection from said engine to each of said traction elements, a differential gear set included in each of said driving connections and each set having a floating element, a pair of electric generators driven by the floating elements of said gear sets to vary the speed and torque of said traction elements, means providing a load for said generators, a steering controller having a single movable control element, and means controlled by said control element when moved in one direction for varying the load of one generator and for varying the load of the other generator when moved in the opposite direction.

2. In combination, a vehicle having independently rotatable traction elements on opposite sides thereof, an engine for driving said vehicle, a driving connection from said engine to each of said traction elements, a differential gear set included in each of said driving connections and each set having a floating element, a pair of traction dynamos connected to the floating elements of said gear sets to vary the speed and torque of said traction elements, means for operating said pair of dynamos as generators and for applying additional torque to said engine shaft in the direction of engine rotation, means responsive to increase in speed of said vehicle for reversing the operation of said pair of dynamos to operate said dynamos as motors by power supplied from said engine, a steering controller having a single movable control element, and means controlled by said element when moved in one direction for varying the effectiveness of one of said pair of dynamos and when moved in the opposite direction to vary the effectiveness of the other of said pair of dynamos.

3. In combination, a vehicle having independently rotatable traction elements on opposite sides thereof, an engine for driving said vehicle, individual power transmission means for driving each of said traction elements from said engine, speed responsive means individual to each of said traction elements, and means for controlling each of said power transmission means by its associated speed responsive means to increase the driving torque transmitted to the respective traction elements as the speed thereof decreases.

4. A vehicle driving system according to claim 3 in combination with means for steering said vehicle comprising means for changing the standard of operation of one of said speed responsive means.

5. In combination, a vehicle having independently rotatable traction elements on opposite sides thereof, an engine for driving said vehicle, power transmission means for driving each of said traction elements from said engine, said power transmission means including means for changing the speed ratio for each of said traction elements, speed responsive control means driven by each of said traction elements and means for controlling each of said speed ratio changing means by its associated speed responsive means to decrease the speed ratio as the speed of the traction element increases.

6. A vehicle driving system according to claim 5 in combination with means for steering said vehicle comprising means for changing the standard of operation of one of said speed ratio changing means.

7. In combination, a vehicle having independently rotatable traction elements on opposite sides thereof, an engine for driving said vehicle, a power dynamo driven by said engine, a pair of traction motors for driving said traction elements, said motors being connected to said power dynamo by parallel circuit connections, each connection including the armature of one traction motor and a main field winding of the other traction motor connected in serial circuit relation.

8. In combination, a vehicle having independently rotatable traction elements on opposite sides thereof, an engine for driving said vehicle, a driving connection from said engine to each of said traction elements, a differential gear set included in each of said driving connections and each set having a floating element, a pair of traction dynamos connected to the floating elements of said gear sets to vary the speed and torque of said traction elements, and a power dynamo driven by said engine, said traction dynamos being connected to said power dynamo by a pair of parallel circuits, each circuit including the armature of one traction dynamo and a main field winding of the other traction dynamo in serial circuit relation.

9. A combination according to claim 8, wherein the power dynamo is provided with a series field winding connected to operate said dynamo as a motor in the direction of engine rotation by current supplied from the traction dynamos acting as generators.

10. A combination according to claim 8 wherein during the initial stages of acceleration of the vehicle, the power dynamo operates as a motor in the direction of engine rotation by current supplied from the traction dynamos operating as generators, in combination with means responsive to increase in speed of the vehicle for changing the operation of the power dynamo from a motor to a generator to drive said traction dynamos in the opposite direction.

11. A combination according to claim 7 and including means for steering said vehicle comprising means for at will variably shunting the field winding of either traction motor.

12. In combination, a vehicle having independently rotatable traction elements on opposite sides thereof, an engine for driving said vehicle, a driving connection from said engine to each of said traction elements, a differential gear set included in each of said driving connections and each set having a floating element, a pair of traction dynamos connected to the floating elements of said gear sets to vary the speed and torque of said traction elements, circuit connections for operating said traction dynamos as generators to set up a mechanical reaction through said gear sets whereby said vehicle is propelled, and means for at will varying the load on either traction dynamo whereby said vehicle is steered in one direction or the other.

13. In combination, a vehicle having independently rotatable traction elements on opposite sides thereof, an engine for driving said vehicle, a driving connection from said engine to each of said traction elements, a differential gear set included in each of said driving connections and each set having a floating element, a pair of traction dynamos connected to the floating elements of said gear sets to vary the speed and torque of said traction elements, and circuit means connecting said traction dynamos for operation of one dynamo as a generator to drive the other dynamo at increased speed in the same direction, whereby said traction elements are driven at different speeds.

ERNST WEBER.